(12) United States Patent
Himmel

(10) Patent No.: US 11,590,910 B2
(45) Date of Patent: Feb. 28, 2023

(54) HIGH-VOLTAGE LINE AND HIGH-VOLTAGE SYSTEM

(71) Applicant: Lisa Draexlmaier GmbH, Vilsbiburg (DE)

(72) Inventor: Joerg Himmel, Au in der Hallertau (DE)

(73) Assignee: Lisa Draexlmaier GmbH

( * ) Notice: Subject to any disclaimer, the term of this patent is extended or adjusted under 35 U.S.C. 154(b) by 0 days.

(21) Appl. No.: 17/403,346

(22) Filed: Aug. 16, 2021

(65) Prior Publication Data

US 2022/0055559 A1 Feb. 24, 2022

(30) Foreign Application Priority Data

Aug. 19, 2020 (DE) ...................... 10 2020 121 723.4

(51) Int. Cl.
*H01B 9/00* (2006.01)
*B60R 16/03* (2006.01)
*H02G 3/04* (2006.01)

(52) U.S. Cl.
CPC ............. *B60R 16/03* (2013.01); *H01B 9/006* (2013.01); *H02G 3/0437* (2013.01)

(58) Field of Classification Search
USPC ....................................................... 174/105 r
See application file for complete search history.

(56) References Cited

U.S. PATENT DOCUMENTS

| 2,688,060 | A | * | 8/1954 | Elmer | ..................... H01P 1/125 |
| | | | | | 335/61 |
| 5,120,705 | A | * | 6/1992 | Davidson | ................ H01P 1/045 |
| | | | | | 333/260 |
| 5,298,682 | A | * | 3/1994 | Salz | .................... H01B 11/1813 |
| | | | | | 174/105 R |
| 2015/0217654 | A1 | | 8/2015 | Woo et al. | |

FOREIGN PATENT DOCUMENTS

| DE | 2252925 | 5/1974 |
| DE | 4120430 | 1/1992 |
| DE | 69627246 | 1/2004 |
| DE | 102016107937 | 11/2017 |

* cited by examiner

*Primary Examiner* — Krystal Robinson
(74) *Attorney, Agent, or Firm* — Burris Law, PLLC

(57) ABSTRACT

A high-voltage line for motor-vehicle high voltage includes an interior tube surrounding an interior cavity of the high-voltage line, an electrically conducting interior conductor surrounding the interior tube, an intermediate insulation surrounding the interior conductor, an electrically conducting outer conductor surrounding the intermediate insulation, and an outer insulation surrounding the outer conductor. The outer insulation, the outer conductor, the intermediate insulation, the interior conductor, and the interior tube are disposed coaxial to one another.

10 Claims, 3 Drawing Sheets

HIGH-VOLTAGE LINE AND HIGH-VOLTAGE SYSTEM

CROSS-REFERENCE TO RELATED APPLICATIONS

This application claims priority to and the benefit of DE 10 2020 121 723.4, filed on Aug. 19, 2020. The disclosures of the above applications are incorporated herein by reference.

FIELD

The present disclosure relates to a high-voltage line for motor-vehicle high voltage and to a high-voltage system.

BACKGROUND

The statements in this section merely provide background information related to the present disclosure and may not constitute prior art.

The present disclosure is described herein primarily in regard to cables for vehicle electrical systems. However, the disclosure can be used for any application where electromagnetic fields of cables are to be compensated, and alternatively or additionally, when heat is to be transported away from the cables.

SUMMARY

This section provides a general summary of the disclosure and is not a comprehensive disclosure of its full scope or all of its features.

The present disclosure provides an improved high-voltage line and an improved high-voltage system using the most constructively simple means possible.

The present disclosure is achieved by the subject matter of the independent claims. Advantageous refinements of the disclosure are specified in the dependent claims, the description, and the accompanying figures. In particular, the independent claims of a claim category can also be refined in a manner analogous to the dependent claims of another claim category.

Using the approach presented here, a single cable can be used as supply line and return line of a high-voltage line. Due to the current flow in opposing directions and the concentric arrangement of the conductors, electromagnetic couplings can be prevented to the greatest possible extent. A coolant channel can be formed in the interior of the cable in order to cool the supply line and the return line from the inside outward.

A high-voltage line is proposed for motor-vehicle high voltage. The high-voltage line includes an interior tube surrounding an interior cavity of the high-voltage line, an electrically conducting interior conductor surrounding the interior tube, an intermediate insulation surrounding the interior conductor, an electrically conducting outer conductor surrounding the intermediate insulation, and an outer insulation surrounding the outer conductor, where the outer insulation, the outer conductor, the intermediate insulation, the interior conductor, and the interior tube are disposed coaxial to one another.

Furthermore, a high-voltage system is proposed, wherein the high-voltage system includes at least one high-voltage line according to the approach presented here, wherein the high-voltage line connects two high-voltage interfaces of the high-voltage system, where at least one coolant stream is guided from the one high-voltage interface to the other high-voltage interface through at least one coolant channel formed in the cavity of the high-voltage line.

Currently motor-vehicle high voltage can be between 400 volts and 1000 volts and is used for transmission of electrical power between drive components of electrically driven vehicles. Currents between 200 amps and 500 amps can be achieved at present. A high-voltage system can be, for example, a drive system of an electrically powered vehicle. The high-voltage line can connect, for example, a traction battery of the vehicle to the power electronics of the vehicle. Likewise, the high-voltage line can connect the power electronics to an electrical machine of the vehicle.

At high currents a strong electromagnetic field arises around the current-carrying conductor. The field direction of the field is dependent on the flow direction of the current in the conductor. The high-voltage line presented here includes two hollow, coaxial conductors, i.e., an interior conductor and an outer conductor. Due to the coaxial arrangement, the resulting electromagnetic fields have a common central point. Since with intended use of the high-voltage line, one of the conductors is used as the supply line, while the other conductor is used as return line, the current flows in both lines in opposing directions. In addition, the currents in both conductors are essentially equal. The electromagnetic fields of the two conductors thereby essentially mutually cancel out, and overall the high-voltage line does not generate a disruptive electromagnetic field.

The high-voltage line can have in particular a round cross-section. However, the high-voltage line can also have a polygonal or oval cross-section. In particular, the high-voltage line can have a closed annular cross-section. Here the high-voltage line can be configured as rotationally symmetric with respect to a geometric center, or mirror-symmetric with respect to a line through the geometric center.

At high currents a large amount of heat is generated, even in conductors made of high-quality conductor material, due to the ohmic resistance of the conductors. Therefore, with the high-voltage line presented here, there is the possibility of guiding a coolant through the cavity inside the conductor, or through at least one coolant channel formed in the cavity. The coolant can transport the heat away. A liquid, for example, can be used as coolant. Compared to a gas, the liquid has a higher heat capacity. A large amount of energy can be transported by the liquid. The coolant channel can be shaped such that a turbulent flow of the coolant is generated at least on a heat-transfer surface between the coolant and the wall of the coolant channel. Due to the turbulent flow, the heat transfer into the coolant can be improved. The interior conductor in particular is cooled by the coolant. The outer conductor can also deliver heat at least partially over a surface of the high-voltage line.

The coolant channel can include an evaporator of an air conditioning system. Due to the evaporating coolant or refrigerant, enough heat can be removed from the high-voltage line such that a specific resistance of the conductor material decreases substantially compared to room temperature. At the same time, less power loss occurs, and consequently less cooling power is required for maintaining the temperature.

The high-voltage line can be electrically contacted at the high-voltage interfaces of the high-voltage system. A high-voltage interface can connect the high-voltage line to an aggregate of the high-voltage system. An aggregate can be, for example, a plug connector or a housing of an electrical component of the high-voltage system.

On at least one of the high-voltage interfaces, the outer conductor can be electrically contacted by an outer-conductor contact of the high-voltage interface, which outer-conductor contact is disposed coaxial to the high-voltage cable. The interior conductor can be electrically contacted by an interior-conductor contact of the high-voltage interface, which interior-conductor contact is disposed coaxial to the high-voltage cable. The electromagnetic fields can also be compensated for by the coaxial contacts, even inside the high-voltage interface. The high-voltage interface can have a round cross-section; the circular or round cross-section can be sealed in a simple manner. In the high-voltage interface, the outer conductor can axially protrude past the outer insulation. The outer conductor can be contacted by the outer-conductor contact on an exposed outer surface. The intermediate insulation can protrude past the outer conductor by a creep distance adapted to the high voltage. Due to the creep distance, creeping currents inside the high-voltage interface can be avoided. A correspondingly dimensioned insulation can be disposed between the outer-conductor contact and the interior-conductor contact. The insulation can abut against the intermediate insulation. The interior conductor can axially protrude past the intermediate insulation. The interior conductor can be contacted on an exposed outer surface by the interior-conductor contact. The interior tube can axially protrude past the interior conductor. To make the connection, the stepwise-stripped high-voltage line can be inserted into the high-voltage interface. Due to the concentric embodiment, the high-voltage interface can be insertable in a self-centering manner.

The cavity can connect two cavity interfaces disposed coaxial to the respective high-voltage interface. A cavity interface can fluidly contact the at least one coolant channel. Alternatively or additionally, the cavity interface can contact electrical and/or optical data lines extending through the cavity. Here the cavity interface is, at least functionally, strictly separated from the high-voltage contacts of the high-voltage interface.

In one form, the high-voltage line can be configured unshielded. In particular, the high-voltage line can be configured without a shield. Due to the concentric arrangement of the interior conductor and of the outer conductor, a shield is unnecessary. Rather, the interior conductor and the outer conductor function as shielding for data lines extending through the cavity.

The outer conductor and the interior conductor can have a line cross-section that is configured for a current carrying capacity of between 200 and 500 amps. The line cross-section can be between 25 square millimeters and 100 square millimeters. In particular, the line cross-section can be greater than 50 square millimeters. Here the outer conductor and the interior conductor can have different material thicknesses. In particular, due to the smaller radius the interior conductor can have a greater material thickness than the outer conductor. In one form without coolant channel, the high-voltage line can only emit heat via its outer surface. Therefore, the interior conductor can have a larger line cross-section than the outer conductor. Here, the interior conductor can be operated as intended at a higher temperature than the outer conductor. However, in forms including a coolant channel, the outer conductor and the interior conductor can have different material thicknesses but essentially equal-sized line cross-sections. If the interior conductor can be maintained, via the coolant channel, at a lower operating temperature than the outer conductor, then the interior conductor can have a smaller line cross-section than the outer conductor.

The outer conductor and/or the interior conductor can be configured as a strand bundle or as a solid unit. In one form, a strand bundle is more flexible and easier to manufacture than a solid form. The solid form can be configured with a smaller outer diameter, since the solid form has a greater thermal conductivity than the form as a strand bundle. The solid form can have large bending radii.

The cavity can be divided into at least two channels by at least one bridge. In particular as coolant channels for opposing coolant currents, the channels can have identical cross-sectional areas. When a separation into a coolant channel and a cable channel is used, the channels can also have different cross-sectional areas.

The cavity can be divided into at least three channels by at least three bridges. The bridges can each be connected on one side to a wall of the interior tube, and on an opposing side to one another. The interior tube can be extruded. The bridges can be simply extruded together with the wall. The channels can be stockpiled as empty tubes for different applications.

At least one data line can be disposed in the cavity. A data line can have been loosely pulled into the cavity. A plurality of data lines can be collected into one casing. The casing of the data line or of the data lines can have a surface structure for influencing the coolant flow. The surface structure can serve as a spacer to the interior tube. For example, the casing can include turbulators for generating a turbulent coolant flow. The data line can be configured as an electrical conductor or as a light guide. A plurality of data lines can be bundled within the cavity. A cable channel formed in the cavity can separate the at least one data line from the at least one coolant channel. The data line can thereby be guided dry along the cavity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
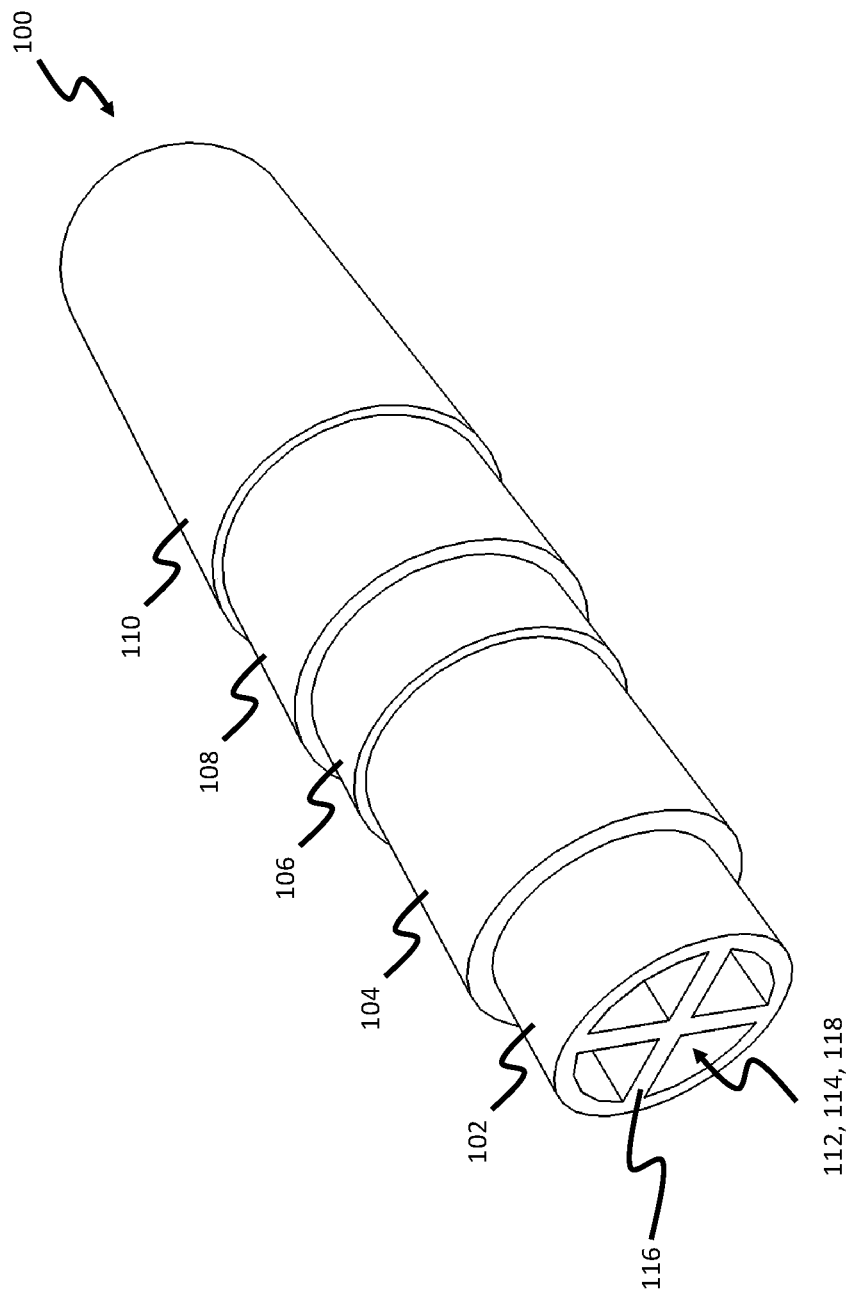
FIG. 1 shows a spatial representation of a high-voltage line according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure presents high-voltage lines in vehicles that can be configured as two high-voltage cables extending essentially in parallel. Here each cable is insulated separately. The cables can be configured as shielded individually or together against electromagnetic radiation, in order to electromagnetically decouple the cables. Within an aggregate high-voltage system of the vehicle, the high-voltage lines can be configured as solid bus-bars. A housing of the aggregate system then acts as the electromagnetic shielding.

The cables can be bundled into a high-voltage line. Then the high-voltage line can include a separate coolant channel between the cables, and a coolant stream can be conducted through the coolant channel for discharging heat.

For ease of understanding, in the following description the reference numbers are used consistently in reference to FIGS. 1-3.

FIG. 1 shows a spatial representation of a high-voltage line 100 according to an example form. The high-voltage line 100 has a concentric construction. From inside outward, the high-voltage line 100 includes an interior tube 102, an interior conductor 104, an intermediate insulation 106, an outer conductor 108, and an outer insulation 110. The interior tube 102 is hollow and surrounds an interior cavity 112 of the high-voltage line 100. The interior conductor 104, the intermediate insulation 106, the outer conductor 108, and the outer insulation 110 are also each tubular. Here the high-voltage line 100 has a round cross-sectional area. However, the high-voltage line 100 can also have, for example, a polygonal cross-sectional area.

For this purpose, the high-voltage line 100 is configured to transmit electrical drive power for an electrically powered vehicle to the motor-vehicle high voltage. The interior conductor 104 and the outer conductor 108 can be used as supply line and return line of a common circuit. Here up to 500 amps can flow per line. Line cross-sections of the interior conductor 104 and of the outer conductor 108 are correspondingly large. Here the line cross-sections of the interior conductor 104 and of the outer conductor 108 are essentially equal-sized. Since an interior radius of the outer conductor 108 is greater than an outer radius of the interior conductor 104 by the material thickness of the intermediate insulation 106, the interior conductor 104 has a greater material thickness than the outer conductor 108, in order to provide the line cross-section. The material thickness of the intermediate insulation 106 and a material thickness of the outer insulation 110 are adapted to the high voltage.

In one form, a coolant channel 114 is formed in the cavity 112. A coolant stream of a suitable coolant can be guided through the coolant channel 114 in order to cool the high-voltage line 100 from inside outward. Here the coolant conducts heat energy away from the high-voltage line 100, which heat energy is generated in particular due to losses due to the ohmic resistance of the interior conductor 104 and of the outer conductor 108. Here in particular the interior conductor 104 is cooled. The outer conductor 108 can also deliver heat energy via an outer surface of the high-voltage line 100.

In one form, the cavity 112 is divided into channels 118 by bridges 116. Here the bridges 116 are disposed as cross-shaped and divide the cavity 112 into four channels 118. Depending on requirements, the bridges 116 can be disposed differently and form different numbers of channels 118. The channels 118 can be used as coolant channels 114 or as empty tubes for data lines, for example. Here the channels 118 have the same cross-sectional area. Depending on the application, the channels 118 can also have different cross-sectional areas.

Figure 2:
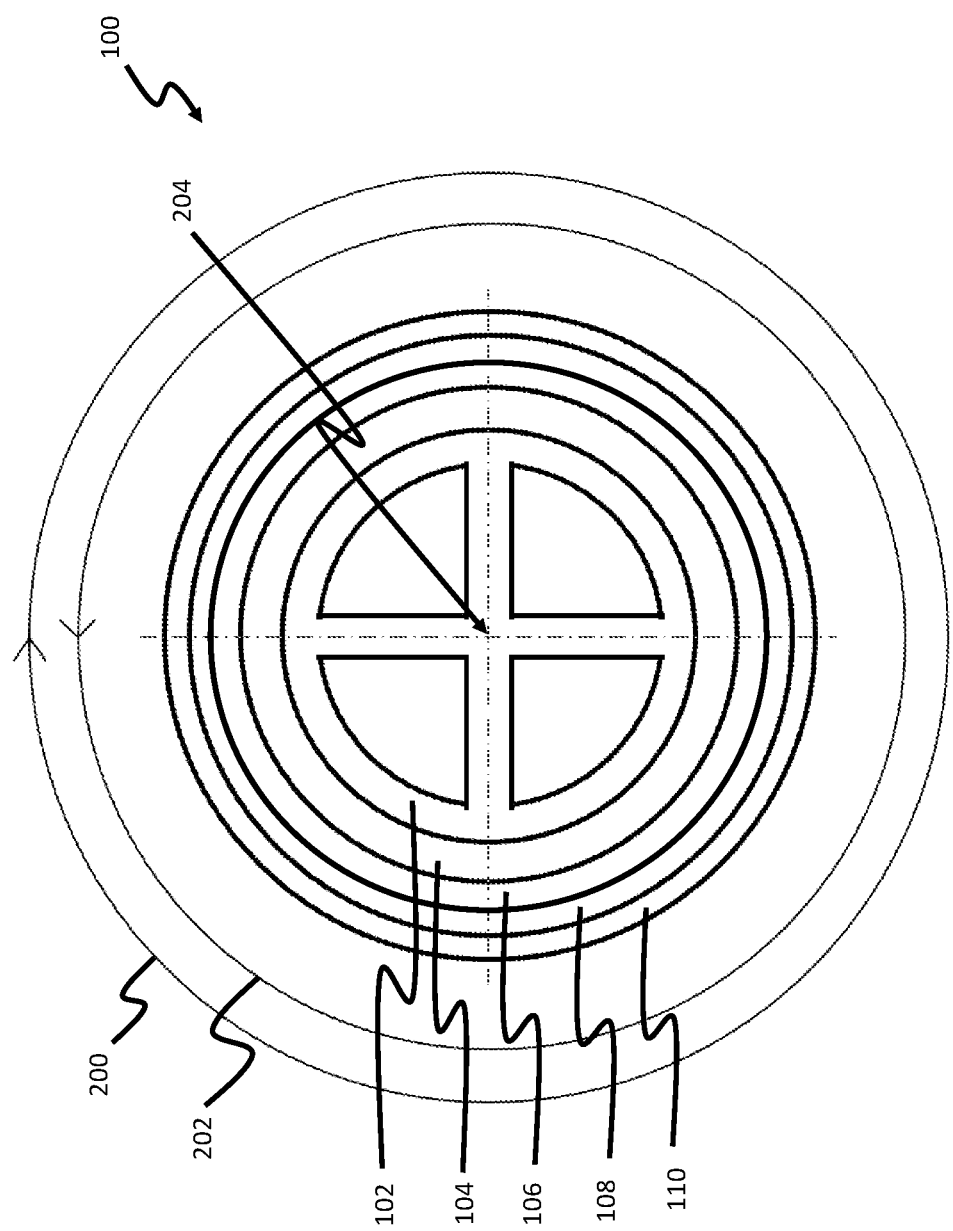
FIG. 2 shows a sectional view of a high-voltage line according to the teachings of the present disclosure.

FIG. 2 shows a sectional representation of a high-voltage line 100 according to one form. Here the high-voltage line 100 essentially corresponds to the high-voltage line in FIG. 1. Here the interior conductor 104 and the outer conductor 108 are used as supply- and return-line in the same circuit; they are thus current-carrying. Since essentially the same current thus flows through the interior conductor 104 as through the outer conductor 108, identically strong electromagnetic fields 200, 202 form around the interior conductor 104 and the outer conductor 108. Since a current direction in the interior conductor 104 is opposite to a current direction in the outer conductor 108, the electromagnetic fields 200, 202 have opposing field directions. Since the interior conductor 104 and the outer conductor 108 are disposed concentric to each other, the electromagnetic fields 200, 202 have a common central point 204. Since the electromagnetic fields 200, 202 have the same central point 204 and the same strength, but opposing field directions, the electromagnetic fields 200, 202 essentially completely mutually cancel. As a result, the high-voltage line 100 presented here does not require shielding.

Figure 3:
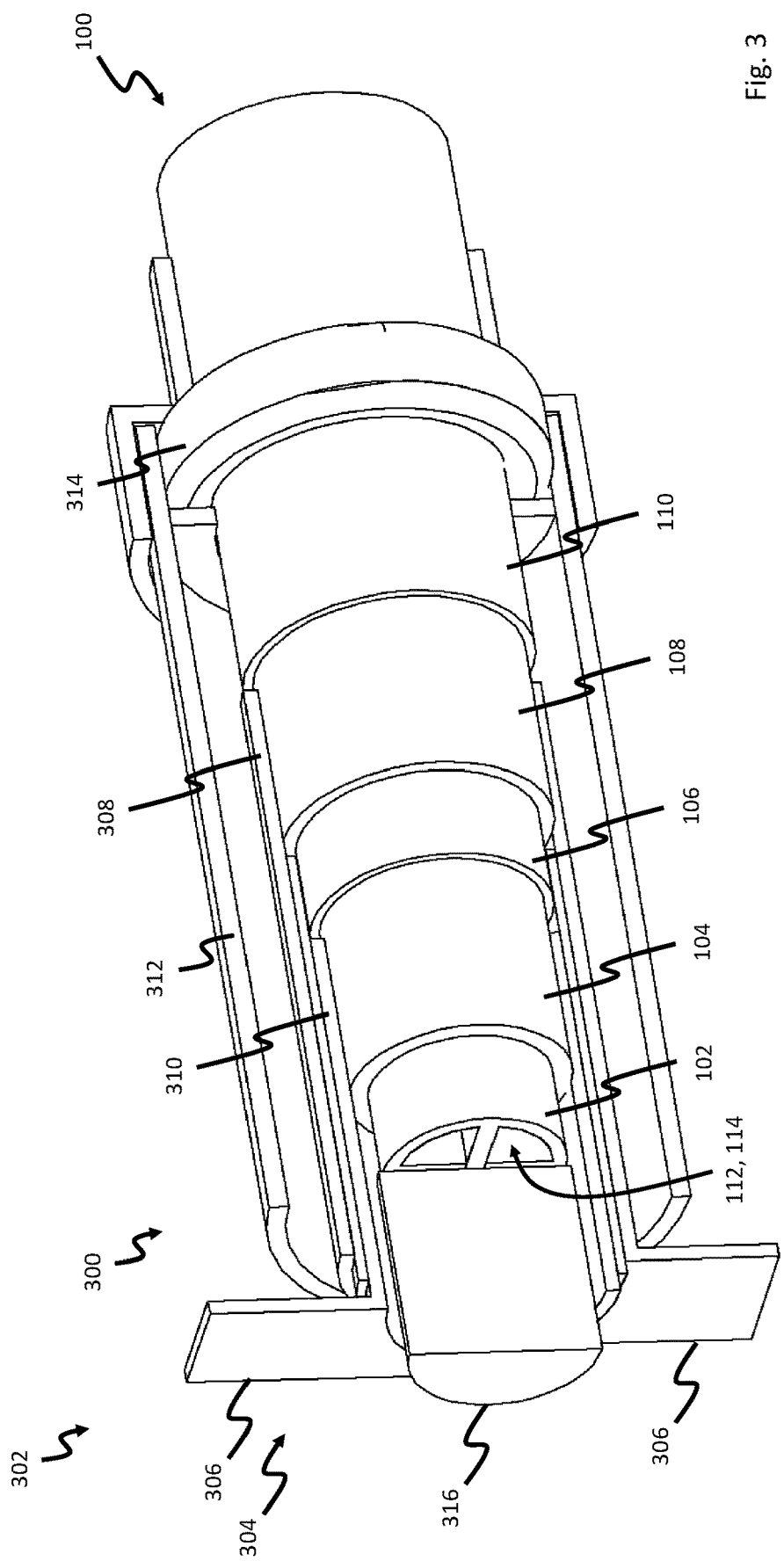
FIG. 3 shows a representation of a high-voltage interface of a high-voltage system according to the teachings of the present disclosure.

FIG. 3 shows a representation of a high-voltage interface 300 of a high-voltage system 302 according to an example. Here the high-voltage system 302 is part of a drive system of an electrically powered vehicle. The high-voltage interface 300 connects a high-voltage line 100, as depicted, for example, in FIGS. 1 and 2, to an aggregate 304 of the high-voltage system 302. Here only end regions of bus-bars 306 of the aggregate 304 are depicted.

The individual concentric layers of the high-voltage line 100 are exposed in a stair-step manner. The outer conductor 108 thereby protrudes axially beyond the outer insulation 110, the intermediate insulation 106 protrudes beyond the outer conductor 108, the interior conductor 104 protrudes beyond the intermediate insulation 106, and the interior tube 102 protrudes beyond the interior conductor 104. The end of the interior tube 102 is blunt. A diameter of the high-voltage line 100 thus decreases stepwise toward the end. The intermediate insulation 106 protrudes past the outer conductor 108 at least by a creep distance adapted to the motor-vehicle high voltage.

Like the high-voltage line 100, the high-voltage interface 300 includes concentric layers. An outer-conductor contact 308 of the high-voltage interface 300 contacts a stripped outer surface of the outer conductor 108. The outer-conductor contact 308 surrounds the outer surface from all sides. An interior-conductor contact 310 of the high-voltage interface 300 contacts a stripped outer surface of the interior conductor 104. The interior-conductor contact 310 surrounds the outer surface from all sides. An insulation layer is disposed between the outer-conductor contact 308 and the interior-conductor contact 310. The insulation layer has a material thickness adapted to the motor-vehicle high voltage. The outer-conductor contact 308 protrudes beyond the insulation layer. The insulation layer protrudes beyond the interior-conductor contact 310. The insulation layer protrudes beyond the interior-conductor contact 310 at least by the creep distance adapted to the motor-vehicle high voltage.

The entire interface 300 is surrounded by a housing 312. The housing 312 is sealed on an outer surface of the outer insulation 110 by a seal 314. Since with the approach presented here, both the supply line and the return line are contained in the high-voltage line 100, the interface 300 can be sealed by a single seal.

In one form, a cavity interface 316 of the aggregate 304 is disposed in the high-voltage interface 300 coaxial to the high-voltage interface 300. The cavity interface 316 contacts the cavity 112 of the interior tube 102. The cavity interface 316 produces a connection to the data line or plurality of lines extending through the cavity 112, and/or the coolant channel 114 or plurality of coolant channels 114 extending through the cavity 112. Here the data line can be operated as an electrical conductor with a low voltage. Likewise, the data line can be configured as an optical light guide.

In other words, a concentric power line is presented.

Electrical connections for transmission of high powers generate strong electromagnetic fields, which can conventionally only be reduced or controlled by auxiliary measures, such as shielding or filters. In addition, the transmission of high powers leads to a heating of the conductors, which can also be actively cooled in order to inhibit thermal damage to the insulation.

Due to the arrangement of the supply- and return-lines (plus and minus) in a planar parallel manner as close-as-possible to each other, the generated electromagnetic fields—in particular in the lower frequency range—almost completely cancel out, so that ideally no additional EMC measures are required. In the approach presented here, the conductors are disposed as concentric tubes or stranded bundles so that circumferentially they are separated from each other only by an insulation layer. In the center a cavity is provided that can be traversed by a coolant and/or offers installation space for other media extending parallel to the power line (e.g., data lines).

Due to the approach presented here, one line strand can be saved per application and a cost-intensive shield connection can be omitted. The high-voltage line presented here makes possible a simple shaping due to unrestricted bending directions. In addition, with a round cross-section a simple sealing is quite possible.

A line with direct (internal) cooling is presented which does not require any shielding expense.

Due to the omission of the shielding, the connecting to aggregates, such as, for example, a plug, can be significantly simplified. Due to the concentric embodiment, a geometric adaptability arises in each direction. Due to the interior cavity, the possibility of an integrated cooling and/or additional line placement is obtained.

The coaxial power conductor is constructed as concentric. Ideally the cross-section is circular, but can also have other geometries (oval, polygonal). In each case a cavity is located in the center, which cavity can also be divided into separate chambers.

From inside outward the conductor is comprised of an interior tube, an interior conductor, an intermediate insulation, an outer conductor, and an outer insulation. Here the conductors can be configured as solid, or as a strand bundle.

With a current-carrying conductor an electromagnetic field develops concentrically around the conductor. Since with the coaxial power line the conductors for supply- and return-flow (plus and minus) are disposed concentrically, and the current strength is the same in both conductors, two equal-sized concentric fields arise with different signs, whereby ideally they mutually cancel out.

The interior cavity can be traversed completely or segmentally by a cooling medium in order to actively regulate the temperature of the conductor connection. Depending on the segmentation, the realization of uni- and bi-directional through-flow is possible.

Additionally or instead of the cooling medium, the interior cavity can also be used to receive signal- and/or communication lines without thus increasing the total diameter of the line strand.

In a manner analogous to a jack plug the connection of the aggregate can be effected by direct contact to the respective conductor tubes and thus without the cancellation of the EMC-relevant concentricity. With the realization by a round cross-section, a media sealing can also be implemented by conventional single-conductor seals (or their principle). If additionally the interior cavity is used for additional lines, the aggregate can be contacted directly by a centrally disposed plug and, without additional low-voltage interface, simultaneously with the power supply.

Since the devices and methods described in detail above are example variations, they can be modified in a conventional manner by the person skilled in the art to a wide extent without leaving the field of the disclosure. In particular, the mechanical assemblies and the size ratios of the individual elements with respect to one another are only chosen by way of example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions configured in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A high-voltage line for motor-vehicle high voltage, the high-voltage line comprising:
    an interior tube surrounding an interior cavity of the high-voltage line;
    an electrically conducting interior conductor surrounding the interior tube;
    an intermediate insulation surrounding the interior conductor;
    an electrically conducting outer conductor surrounding the intermediate insulation; and
    an outer insulation surrounding the electrically conducting outer conductor, wherein the outer insulation, the electrically conducting outer conductor, the intermediate insulation, the electrically conducting interior conductor, and the interior tube are disposed coaxial to one another, wherein at least one data line is disposed in the interior cavity.

2. The high-voltage line according to claim 1, wherein the high-voltage line is unshielded.

3. The high-voltage line according to claim 1, wherein the electrically conducting outer conductor and the electrically conducting interior conductor have a line cross-section that is configured for a current-carrying capacity between 200 and 500 amps.

4. The high-voltage line according to claim 1, wherein the electrically conducting outer conductor, the electrically conducting interior conductor, or a combination thereof is a strand bundle.

5. The high-voltage line according to claim 1, wherein the interior cavity is divided into at least two channels by at least one bridge.

6. The high-voltage line according to claim 5, wherein the interior cavity is divided by at least three bridges into at least three channels, wherein on one side the bridges are each connected to a wall of the interior tube and are connected to one another on an opposing side.

7. A high-voltage system comprising:
    at one high-voltage line according to claim 1, wherein the high-voltage line connects two high-voltage interfaces of the high-voltage system, wherein at least one coolant stream is guided from the one high-voltage interface to the other high-voltage interface through at least one coolant channel formed in the interior cavity of the high-voltage line.

8. The high-voltage system according to claim 7, wherein on at least one of the high-voltage interfaces, the electrically conducting outer conductor is electrically contacted by an outer-conductor contact of the high-voltage interface, wherein the outer-conductor contact is disposed coaxial to the high-voltage line, and the electrically conducting interior conductor is electrically contacted by an interior-conductor contact of the high-voltage interface, wherein the interior-conductor contact is disposed coaxial to the high-voltage line.

9. The high-voltage system according to one of claim 8, wherein the interior cavity connects two cavity interfaces disposed coaxial to the respective high-voltage interface.

10. The high-voltage system according to one of claim 7, wherein the interior cavity connects two cavity interfaces disposed coaxial to the respective high-voltage interface.

* * * * *